US010198183B2

(12) United States Patent
Cannata et al.

(10) Patent No.: US 10,198,183 B2
(45) Date of Patent: Feb. 5, 2019

(54) TUNNELING OF STORAGE OPERATIONS BETWEEN STORAGE NODES

(71) Applicant: Liqid Inc., Lafayette, CO (US)

(72) Inventors: James Scott Cannata, Denver, CO (US); Jason Breakstone, Broomfield, CO (US)

(73) Assignee: Liqid Inc., Broomfield, CO (US)

( * ) Notice: Subject to any disclaimer, the term of this patent is extended or adjusted under 35 U.S.C. 154(b) by 285 days.

(21) Appl. No.: 15/016,879

(22) Filed: Feb. 5, 2016

(65) Prior Publication Data

US 2016/0231939 A1    Aug. 11, 2016

Related U.S. Application Data

(60) Provisional application No. 62/112,840, filed on Feb. 6, 2015.

(51) Int. Cl.
| G06F 13/38 | (2006.01) |
| G06F 3/06 | (2006.01) |
| G06F 13/42 | (2006.01) |
| G06F 13/40 | (2006.01) |

(52) U.S. Cl.
CPC .......... *G06F 3/0604* (2013.01); *G06F 3/0635* (2013.01); *G06F 3/0685* (2013.01); *G06F 13/4022* (2013.01); *G06F 13/4282* (2013.01)

(58) Field of Classification Search
None
See application file for complete search history.

(56) References Cited

U.S. PATENT DOCUMENTS

| 5,828,207 | A | 10/1998 | Saadeh |
| 6,061,750 | A | 5/2000 | Beardsley et al. |
| 6,325,636 | B1 | 12/2001 | Hipp et al. |
| 6,687,718 | B2 * | 2/2004 | Gagne ................. G06F 11/1451 |
| 7,243,145 | B1 | 7/2007 | Poortman |
| 7,260,487 | B2 | 8/2007 | Brey et al. |
| 7,505,889 | B2 | 3/2009 | Salmonsen et al. |
| 7,606,960 | B2 | 10/2009 | Munguia |

(Continued)

OTHER PUBLICATIONS

Aragon, Juan L. et al., "Control Speculation for Energy-Efficient Next-Generation Superscalar Processors," IEEE Transactions on Computers, vol. 55, No. 3, pp. 281-291, Mar. 2006.

(Continued)

*Primary Examiner* — Cheng Yuan Tseng

(57) ABSTRACT

Systems, methods, apparatuses, and software for data storage systems are provided herein. In one example, a data storage system is provided that includes at least one storage drive and at least one processing module coupled over a Peripheral Component Interconnect Express (PCIe) fabric. The data storage system includes a first processing module in a first storage assembly configured to receive a storage operation for a storage drive managed by a second processing module in a second storage assembly. The first processing module is configured to identify the second processing module as managing the storage drive associated with the storage operation and responsively transfer the storage operation over a tunneled network connection for handling by the second processing module of the second storage assembly.

20 Claims, 7 Drawing Sheets

(56) References Cited

U.S. PATENT DOCUMENTS

| | | | |
|---|---|---|---|
| 7,725,757 B2 | 5/2010 | Padweka et al. | |
| 7,877,542 B2 | 1/2011 | Chow et al. | |
| 8,010,496 B2* | 8/2011 | Okada | G06F 11/1456 707/640 |
| 8,102,847 B2* | 1/2012 | Koide | H04L 12/4633 370/390 |
| 8,125,919 B1 | 2/2012 | Khanka et al. | |
| 8,150,800 B2 | 4/2012 | Webman et al. | |
| 8,656,117 B1 | 2/2014 | Wong et al. | |
| 8,688,926 B2 | 4/2014 | Breakstone et al. | |
| 8,880,771 B2 | 11/2014 | Subramaniyan et al. | |
| 9,563,463 B2* | 2/2017 | Innan | G06F 9/5088 |
| 9,602,437 B1 | 3/2017 | Bernath | |
| 2002/0059428 A1 | 5/2002 | Susai et al. | |
| 2003/0084219 A1* | 5/2003 | Yao | H04L 29/06 710/300 |
| 2003/0110423 A1 | 6/2003 | Helms et al. | |
| 2003/0126478 A1 | 7/2003 | Burns et al. | |
| 2005/0223136 A1 | 10/2005 | Tanaka et al. | |
| 2006/0277206 A1 | 12/2006 | Bailey et al. | |
| 2007/0067432 A1 | 3/2007 | Tarui et al. | |
| 2008/0034153 A1 | 2/2008 | Lee et al. | |
| 2008/0198744 A1 | 8/2008 | Menth | |
| 2008/0281938 A1 | 11/2008 | Rai et al. | |
| 2009/0006837 A1 | 1/2009 | Rothman et al. | |
| 2009/0100280 A1 | 4/2009 | Lindsay | |
| 2009/0190427 A1 | 7/2009 | Brittain et al. | |
| 2009/0193201 A1 | 7/2009 | Brittain et al. | |
| 2009/0193203 A1 | 7/2009 | Brittain et al. | |
| 2009/0276551 A1 | 11/2009 | Brown et al. | |
| 2010/0088467 A1 | 4/2010 | Lee et al. | |
| 2011/0289510 A1 | 11/2011 | Lin et al. | |
| 2011/0299317 A1 | 12/2011 | Shaeffer et al. | |
| 2011/0320861 A1 | 12/2011 | Bayer et al. | |
| 2012/0030544 A1 | 2/2012 | Fisher-Jeffes | |
| 2012/0089854 A1 | 4/2012 | Breakstone et al. | |
| 2012/0151118 A1 | 6/2012 | Flynn et al. | |
| 2012/0166699 A1 | 6/2012 | Kumar et al. | |
| 2012/0210163 A1 | 8/2012 | Cho | |
| 2012/0317433 A1 | 12/2012 | Ellis et al. | |
| 2013/0132643 A1 | 5/2013 | Huang | |
| 2013/0185416 A1 | 7/2013 | Larkin et al. | |
| 2014/0047166 A1 | 2/2014 | Asnaashari et al. | |
| 2014/0056319 A1 | 2/2014 | Hellwig | |
| 2014/0059265 A1 | 2/2014 | Iyer et al. | |
| 2014/0075235 A1 | 3/2014 | Chandhoke et al. | |
| 2014/0103955 A1 | 4/2014 | Avritch et al. | |
| 2014/0108846 A1 | 4/2014 | Berke et al. | |
| 2014/0365714 A1 | 12/2014 | Sweere et al. | |
| 2015/0074322 A1 | 3/2015 | Galles | |
| 2015/0121115 A1 | 4/2015 | Chandra et al. | |
| 2015/0186437 A1 | 7/2015 | Molaro | |
| 2015/0212755 A1 | 7/2015 | Asnaashari | |
| 2015/0304423 A1 | 10/2015 | Satoyama et al. | |
| 2015/0373115 A1 | 12/2015 | Breakstone et al. | |
| 2016/0197996 A1 | 7/2016 | Barton et al. | |
| 2016/0248631 A1 | 8/2016 | Duchesneau | |

OTHER PUBLICATIONS

International Application No. PCT/US2017/046602, International Search Report & Written Opinion, 8 pages, dated Oct. 19, 2017.

International Application No. PCT/US2017/046607, International Search Report & Written Opinion, 7 pages, dated Oct. 23, 2017.

Lu, Yingping et al., "Performance Study of iSCSI-Based Storage Subsystems," IEEE Communications Magazine, pp. 76-82, Aug. 2003.

* cited by examiner

TUNNELING OF STORAGE OPERATIONS BETWEEN STORAGE NODES

RELATED APPLICATIONS

This application hereby claims the benefit of priority to U.S. Provisional Patent Application 62/112,840, titled "TUNNELING OF STORAGE OPERATIONS BETWEEN STORAGE NODES," filed Feb. 6, 2015, which is hereby incorporated by reference in its entirety.

TECHNICAL BACKGROUND

Computer systems typically include bulk storage systems, such as magnetic disc drives, optical storage devices, tape drives, or solid state storage drives, among other storage systems. In these computer systems, a host system, such as a network device, server, or end-user computing device, communicates with external bulk storage systems to store data or to access previously stored data. These bulk storage systems are traditionally limited in the number of devices that can be included per host and also have large physical space requirements due to the separate physical packaging of individual storage drives, which can be problematic in storage environments where higher capacity, redundancy, and reliability is desired. These shortcomings can be especially pronounced with the increasing data storage and retrieval needs in networked, cloud, and enterprise environments.

Overview

Systems, methods, apparatuses, and software for data storage systems are provided herein. In one example, a data storage system is provided that includes at least one storage drive and at least one processing module coupled over a Peripheral Component Interconnect Express (PCIe) fabric. The data storage system includes a first processing module in a first storage assembly configured to receive a storage operation for a storage drive managed by a second processing module in a second storage assembly. The first processing module is configured to identify the second processing module as managing the storage drive associated with the storage operation and responsively transfer the storage operation over a tunneled network connection between the first storage assembly and the second storage assembly. The second processing module is configured to receive the storage operation over the tunneled network connection and handle the storage operation with the storage drive of the second storage assembly over the PCIe fabric of the second storage assembly.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
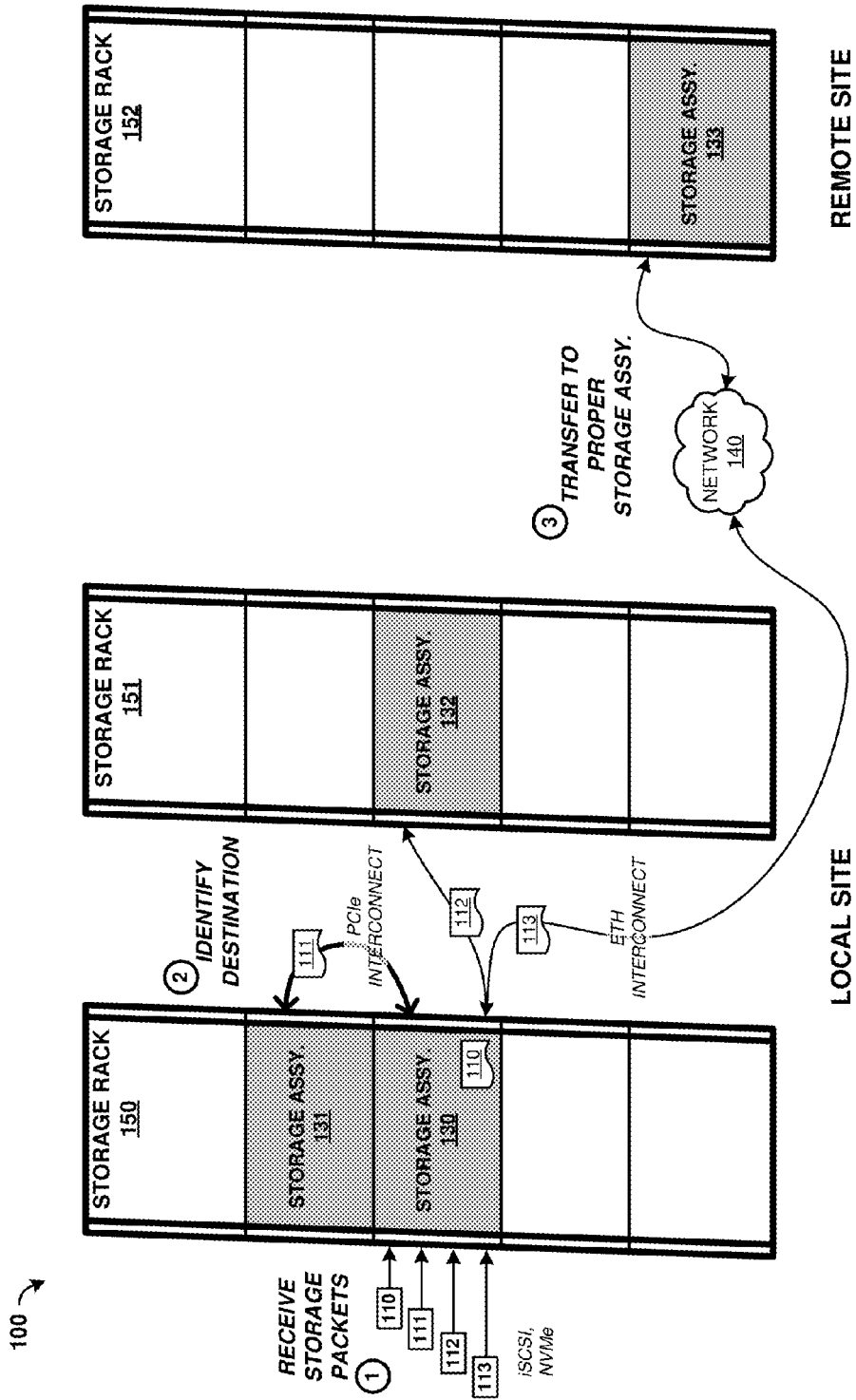
FIG. 1 is a system diagram illustrating a storage system.

FIG. 1 is a system diagram illustrating storage system 100. Storage system 100 includes several storage racks comprising one or more storage assemblies for storing and retrieving data. Storage rack 150 includes storage assembly 130 and storage assembly 131. Storage rack 151 includes storage assembly 132. Storage assembly 152 includes storage assembly 133. Each storage rack can include physical support structures as well as climate control features such as venting, fans, and the like. Each storage assembly includes a plurality of storage drives, such as solid state storage devices, as well as processors and various interconnect circuitry and power supply equipment. Further examples of these storage assemblies are discussed in the figures below.

Storage operations, such as write operations or read operations, are received by any of the storage assemblies in FIG. 1. These storage assemblies then direct the storage operations toward appropriate storage drives that ultimately execute the write operations or read operations. However, in the examples herein, the storage drives that are associated with a particular storage operation might not be located in the storage assembly in which the storage operation is received initially. In this manner, any storage assembly can receive a storage operation that is ultimately handled in storage drives of another storage assembly. Four example storage operations are discussed below for FIG. 1.

Each storage assembly 131-133, among other storage assemblies not shown in FIG. 1 for clarity, are interconnected using one or more communication links. In some examples, these communication links comprise external Peripheral Component Interconnect Express (PCIe) links, such as the link between storage assembly 130 and storage assembly 131. In another example, Ethernet links are employed, such as links between storage assembly 130 and 132 or between storage assembly 130 and storage assembly 133 over network 140. The Ethernet links can comprise TCP/IP (Transmission Control Protocol/Internet Protocol) links or other network links, such as Infiniband, FibreChannel, Thunderbolt, or other links, including combinations thereof.

Storage operations are each received over a network interface associated with a storage assembly, and any of storage assemblies 130-133 can receive storage operations. For simplicity, FIG. 1 shows storage assembly 130 receiving the storage operation 110-113. These storage operations can comprise iSCSI (Internet Small Computer System Interface) storage operations received over a TCP/IP link. In other examples, these storage operations comprise NVMe (NVM Express) storage operations.

Once these storage operations are received in a storage assembly, a processing module included therein identifies a destination for the storage operation. The destination might be for storage drives managed by the storage assembly that receives the storage operation. The destination might instead be for storage drives managed by a storage assembly other than the one that receives the storage operation.

For storage packets associated with storage operation 110 that are received by storage assembly 130, storage assembly 130 determines that storage assembly itself manages the storage drives for storage operation 110. Storage operation 110 can be handled over an internal PCIe fabric of storage assembly 130, such the PCIe fabric described below for FIG. 2.

For storage packets received for storage operation 111, storage assembly 130 determines that storage assembly 131 manages the storage drives for storage operation 111. Storage operation 111 is transferred over an external PCIe interconnect link to storage assembly 131. Storage assembly 131 then handles storage operation 111 over an internal PCIe fabric of storage assembly 131.

For storage packets received for storage operation 112, storage assembly 130 determines that storage assembly 132 manages the storage drives for storage operation 112. Storage operation 112 is transferred over an external Ethernet interconnect link to storage assembly 132. Storage assembly 132 then handles storage operation 112 over an internal PCIe fabric of storage assembly 132.

For storage packets received for storage operation 113, storage assembly 130 determines that storage assembly 133 manages the storage drives for storage operation 113. Storage operation 113 is transferred over an external Ethernet interconnect link and network 130 to storage assembly 133. Storage assembly 133 then handles storage operation 113 over an internal PCIe fabric of storage assembly 133. Network 130 can comprise one or more packet networks which can include the Internet. As shown in FIG. 1, storage rack 150 and storage rack 151 are located together at a local site, while storage rack 152 is located at a remote site.

Thus, any storage operation received over an external network interface or external storage interface of storage assembly 130 (or any other storage assembly) can be either managed by the receiving storage assembly or transferred to another storage assembly. In the examples below, further descriptions are included for the handling of storage operations by storage assemblies using network interfaces to tunnel the storage packets received by a first storage assembly for use by another storage assembly. For example, when iSCSI storage packets comprising a storage operation are received in a first storage assembly, these iSCSI storage packets can transferred to another storage assembly over a layer 2 network tunnel so that the other storage assembly acts as if it had received the iSCSI storage packets originally.

Figure 2:
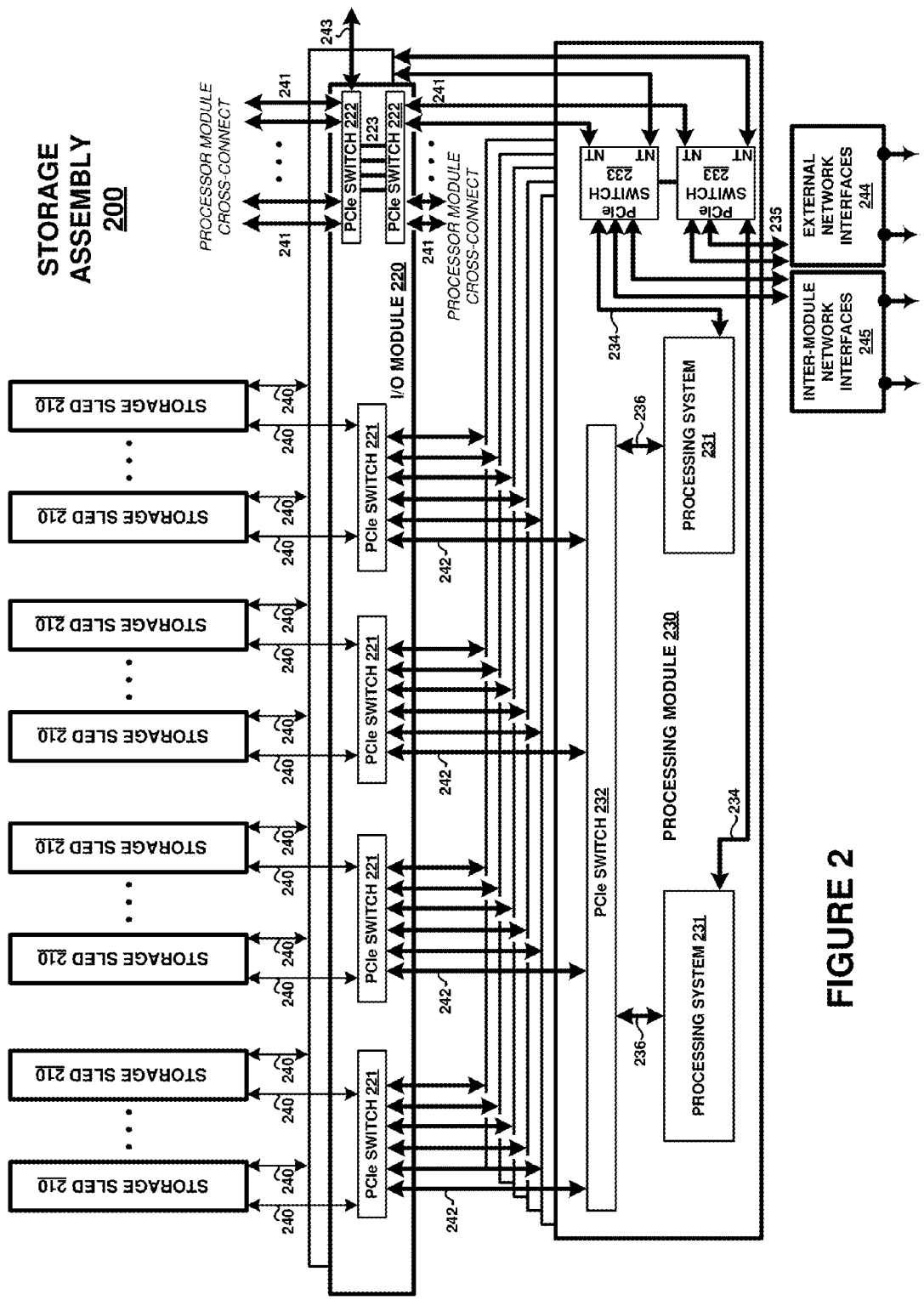
FIG. 2 is a block diagram illustrating a storage assembly.

FIG. 2 is a system diagram illustrating storage assembly 200. Storage assembly 200 includes three different module types in FIG. 2, namely storage sleds 210, input/output (I/O) modules 220, and processing modules 230. In this example, 48 storage sleds, 2 I/O modules, and 6 processing modules are included. However, it should be understood that any number of storage sleds 210, I/O modules 220, and processing modules 230 can be included. Additionally, power supply modules and associated power and control distribution links can also be included, but are omitted in FIG. 2 for clarity.

A module typically comprises physical support structure and enclosure that includes circuitry, printed circuit boards, semiconductor systems, and structural elements. The modules are insertable and removable from a rackmount style of enclosure. In some examples, the elements of FIG. 2 are included in a 2U chassis for mounting in a larger rackmount environment, such as that described in FIG. 1. It should be understood that the elements of FIG. 2 can be included in any physical mounting environment, and need not include any associated enclosures or rackmount elements.

A plurality of storage sleds 210 are included in system 200. Each storage sled 210 includes one or more storage drives, such as four in some examples. Each storage sled 210 also includes Peripheral Component Interconnect Express (PCIe) switches, processors, and control system elements. PCIe switches of each storage sled 210 communicate with one or more on-sled storage drives over associated PCIe links. PCIe switches of each storage sled 210 also are communicatively coupled to an on-sled processor or control system for traffic statistics retrieval and status monitoring, among other operations. PCIe switches of each storage sled 210 communicate over one or more PCIe links 240 with an associated PCIe switch 221 of an I/O module 220.

Each PCIe switch 221 of I/O modules 220 communicate over associated PCIe links 242 with associated PCIe switch 232 of one or more processing modules 230. PCIe switch 232 communicates with one or more associated processing systems 231. I/O modules 220 also each include a plurality of PCIe switches 222 for interconnecting processor modules, such as processor modules 230. PCIe switches 222 are includes for this processor module cross-connect, and communicate with ones of PCIe switches 233 in associated processing modules 230 over processor module cross-connect links 241. PCIe switches 233 communicate with ones of processing systems 231 over PCIe links 234. PCIe switches 222 can also each include 2U cross-connect links 243, which are used to expand the PCIe fabric to other physical 2U enclosures.

In the example in FIG. 2, PCIe switches 221 and 232 (and associated PCIe links) are included in a back end data plane of system 200, and used for carrying user data between storage sleds 210 and processing modules 230. PCIe switches 222 and 233 (and associated PCIe links) are included in a front end data plane of system 200, and used for carrying user data and signaling between processing modules and externally-facing network interfaces.

Each processing module 230 communicates over one or more PCIe links 235 through PCIe switches 233 with external expansion cards or external PCIe ports. In some examples, the external network expansion cards include network interface cards for communicating over TCP/IP (Transmission Control Protocol (TCP)/Internet Protocol) networks or for carrying iSCSI (Internet Small Computer System Interface) or NVMe (NVM Express) traffic. These external network links are illustrated by external network interfaces 244. External access to storage assembly 200 is provided over ones of packet network links provided by external network interfaces 244, such as for end user access to data stored on storage sleds 210.

Each processing module 230 can also communicate with other processing modules, such as those in other storage assemblies, over one or more inter-module packet network interfaces 245. In some examples, module packet network interfaces 245 include network interface cards for communicating over Ethernet or TCP/IP (Transmission Control Protocol (TCP)/Internet Protocol) networks for exchanging storage packets between processing modules. Further operation of inter-module storage packet exchange over Ethernet is discussed in the examples below.

The PCIe switches discussed herein can comprise PCIe crosspoint switches, which logically interconnect various ones of the associated PCIe links based at least on the traffic carried by each PCIe link. Each PCIe switch port can be a non-transparent (NT) or transparent port. An NT port can allow some logical isolation between endpoints, much like a bridge, while a transparent port does not allow logical isolation, and has the effect of connecting endpoints in a purely switched configuration. Access over an NT port or ports can include additional handshaking between the PCIe switch and the initiating endpoint to select a particular NT port or to allow visibility through the NT port. In other examples, a domain-based PCIe signaling distribution can be included which allows segregation of PCIe ports of a PCIe switch according to user-defined groups.

PCIe can support multiple bus widths, such as x1, x4, x8, x16, and x32, with each multiple of bus width comprising an additional "lane" for data transfer. PCIe also supports transfer of sideband signaling, such as System Management Bus (SMBus) interfaces and Joint Test Action Group (JTAG) interfaces, as well as associated clocks, power, and bootstrapping, among other signaling. Although PCIe is used in FIG. 2, it should be understood that different communication links or busses can instead be employed, such as NVMe, Ethernet, Serial Attached SCSI (SAS), FibreChannel, Thunderbolt, Serial Attached ATA Express (SATA Express), among other interconnect, network, and link interfaces. Any of the links in FIG. 2 can each use various communication media, such as air, space, metal, optical fiber, or some other signal propagation path, including combinations thereof. Any of the links in FIG. 2 can include any number of PCIe links or lane configurations. Any of the links in FIG. 2 can each be a direct link or might include various equipment, intermediate components, systems, and networks. Any of the links in FIG. 2 can each be a common link, shared link, aggregated link, or may be comprised of discrete, separate links.

In FIG. 2, any processing system 231 on any processing module 230 has logical visibility to all storage drives 211 in all storage sleds 210. Any processing system 231 can transfer data for storage on any storage drive 211 and retrieve data already stored on any storage drive 211. Thus, 'm' number of storage drives can be coupled with 'n' number of processors to allow for a large, scalable architecture with a high-level of redundancy and density.

To provide visibility of each processing system 231 to any storage sled 210, various techniques can be employed. In a first example, a particular processing system 231 manages (instantiates/binds) a subset number of the total quantity of storage sleds, such as 16 storage drives spanning 4 storage sleds, and handles transactions for that subset of storage drives, such as read and write transactions. Each processing system 231, however, has memory-mapped or routing-table based visibility to the storage drives managed by any other processing system 231 or processing systems in other storage assemblies. When a storage operation is desired for a storage drive not managed by a particular processing system, the particular processing system uses the memory mapped access or routing-table based visibility to direct the storage operation to the proper storage drive for that transaction. The transaction can be transferred and transitioned to the appropriate processing system that manages that storage drive associated with the data of the transaction. The front end PCIe data plane, namely PCIe switches 222 and 233, or inter-module network interfaces 245 are used to transfer data between processing systems so that a particular processing system or processor can store the data in the storage sled or sleds that is managed by that particular processing system, even though the data might be received over a network interface associated with a different processing system.

In operation, such as a write operation, data can be received over portions of external network interfaces 244 by any processing system 231 of any processing module 230. For example, the write operation can be a write operation received over external network interfaces 244 from an end user employing an iSCSI protocol or NVMe protocol. The processing system that receives the write operation determines if it physically manages the storage drive or drives associated with the write operation, and if it does, then the processing system transfers the data for storage on the associated storage drives over back end data plane PCIe links 236. If the processing system determines that it does not physically manage the storage drive or drives associated with the write operation, then the processing system transfers the write operation to another processing module that includes the processing system that does manage the storage drive or drives over either the front end PCIe data plane or over inter-module network interfaces 245. Data striping can be employed by any processing system to stripe data for a particular write transaction over any number of storage drives, such as over all of the storage sleds that include storage drives managed by the particular processing system.

In this example, the PCIe interfaces associated with each processing system 231 have 64-bit address spaces, which allows an addressable space of $2^{64}$ bytes, leading to at least 16 exbibytes of byte-addressable memory. The 64-bit PCIe address space can shared by all processing systems 231 for memory mapping to storage drives on storage sleds. Thus, while each particular processing system 231 actually manages a subset of the total storage drives on storage sleds, all processors 231 have visibility to, and can initiate read/write transactions to, any of storage drives on storage sleds. A managing processing system 231 that manages a particular storage drives on storage sleds receives write/read transactions and any associated data from an initiating processing system 231 by at least using a memory-mapped address space or routing table to establish which processing module handles storage operations for a particular set of storage sleds.

Figure 3:
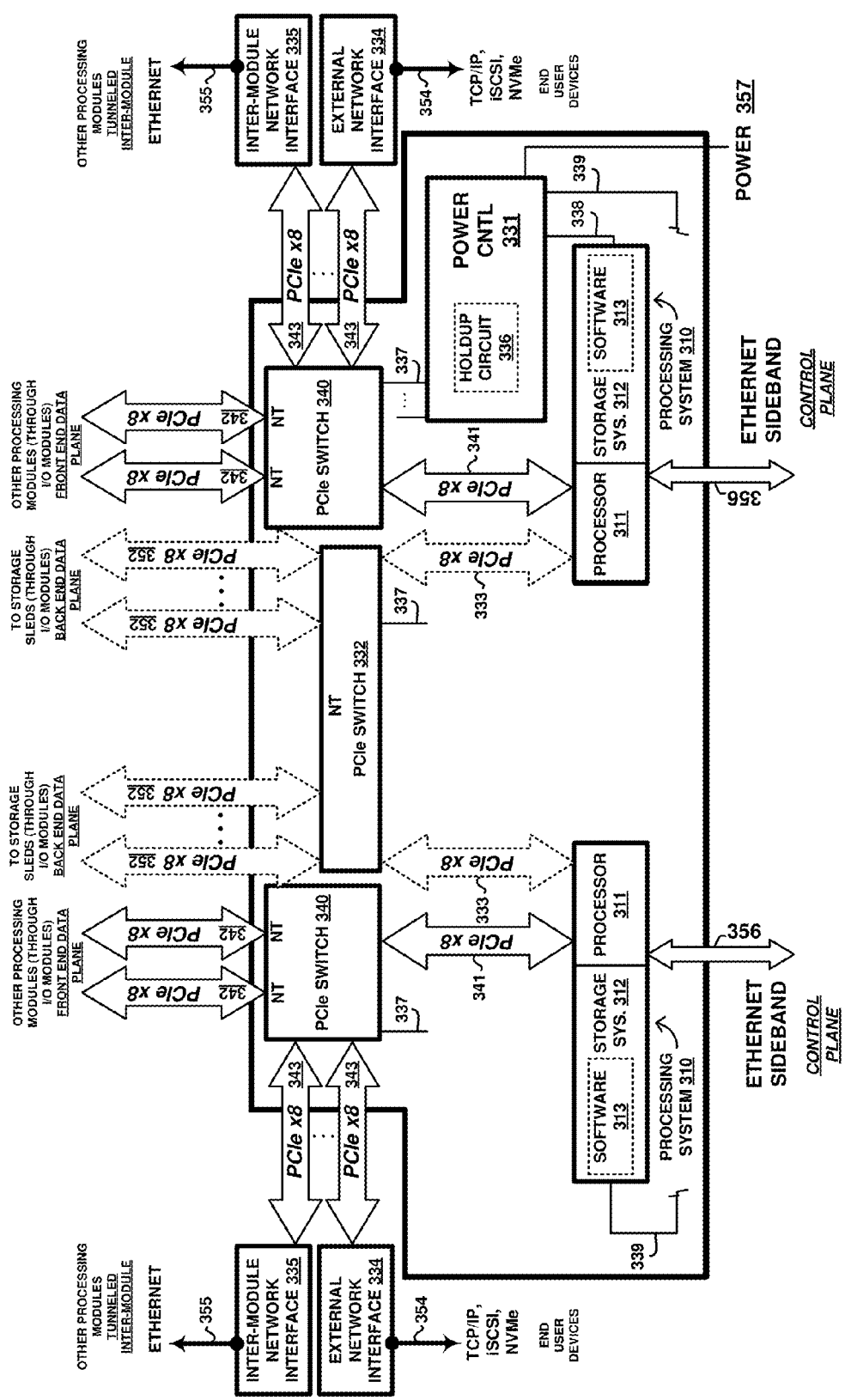
FIG. 3 is a block diagram illustrating a processing module.

FIG. 3 is a block diagram illustrating processing module 300, as an example of processing modules 230 of FIG. 2. Processing module 300 includes two or more processing systems 310, at least one PCIe switch 332, PCIe switches 340, external network interfaces 334, inter-module network interfaces 335, power control module 331, and holdup circuit 336. Power control module 331 distributes power to each element of processing module 300 over associated power links 337-339. Power control module 331 can selectively enable/disable power for each power link. Further communication links can be included for intra-sled communication between the various elements of processing module 300.

Each processing system 310 further includes processor 311 and storage system 312. In some examples, network interfaces 334-335 are included in processing system 310, but network interfaces 334-335, or portions thereof, can be provided by separate circuitry and elements, such as separate PCIe expansion cards. Each processor can communicate over an associated Ethernet sideband signaling link 356, such as with various microprocessors/controllers or power control nodes on other sleds or with I/O modules to retrieve statistical data or usage information. Links 356 can comprise Ethernet interfaces, or can comprise SMBus, JTAG, I2C, CAN, or any other communication interfaces, and in some examples is provided over separate links. Links 356 can be provided using external network interfaces, such as network interface cards or adapters communicatively coupled over ones of PCIe links 343. Each processor 311 also includes at least one PCIe interface, such as a PCIe transceiver and communication circuitry for communicating over associated PCIe links 333 and 341. The PCIe interface of each processor 311 can include a large number of PCIe lanes which are subdivided between narrower PCIe links, such as a x16 interface that is subdivided among two x8 links. In some examples, the PCIe interfaces are integrated into a single-chip die of processor 311. In other examples, the PCIe interface is provided over a separate microchip transceiver which can communicate with an associated processor 311 over another communication interface, such as a front-side bus of processor 311 or peripheral hub chip interface.

Processor 311 can comprise one or more microprocessors and other processing circuitry that retrieves and executes software 313 from storage system 312. Processor 311 can be implemented within a single processing device but can also be distributed across multiple processing devices or subsystems that cooperate in executing program instructions. Examples of processor 311 include general purpose central processing units, application specific processors, and logic devices, as well as any other type of processing device, combinations, or variations thereof. In some examples, processor 311 comprises an Intel or AMD microprocessor, ARM microprocessor, FPGA, ASIC, application specific processor, or other microprocessor or processing elements.

Storage system 312 can comprise any non-transitory computer readable storage media capable of storing software 313 that is executable by processor 311. Storage system 312 can include volatile and nonvolatile, removable and non-removable media implemented in any method or technology for storage of information, such as computer readable instructions, data structures, program modules, or other data. Storage system 312 can be implemented as a single storage device but can also be implemented across multiple storage devices or sub-systems co-located or distributed relative to each other. Storage system 312 can comprise additional elements, such as a controller, capable of communicating with processor 311. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 313 can be implemented in program instructions and among other functions can, when executed by processing system 310 in general or processor 311 in particular, direct processor 311 to operate as commanded by software 313. Software 313 can include processes, programs, or components, such as operating system software, database software, or application software. Software 313 can also comprise firmware or some other form of machine-readable processing instructions executable by elements of processing system 310, such as processor 311. Encoding software 313 on storage system 312 can transform the physical structure of storage system 312. The specific transformation of the physical structure can depend on various factors in different implementations of this description. Examples of such factors can include, but are not limited to the technology used to implement the storage media of storage system 312 and whether the computer-storage media are characterized as primary or secondary storage. For example, if the computer-storage media are implemented as semiconductor-based memory, software 313 can transform the physical state of the semiconductor memory when the program is encoded therein. For example, software 313 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Processing module 300 also interfaces with one or more network interfaces 334 to communicate over one or more packet network links 354, and interfaces with one or more network interfaces 335 to communicate over one or more packet network links 355. One or more network interfaces 334-335 are communicatively coupled to an associated processing system 310 or processor 311 via PCIe links 343 in FIG. 3. External access by end users or end user devices to processing module 300, and the storage sleds managed thereby, can be provided over ones of packet network links 354. Inter-module communications between processing module 300 and other processing modules of a storage assembly or in other storage assemblies can be provided over ones of packet network links 355. In this example, each of packet network links 354-355 can each comprise Ethernet links, Transmission Control Protocol/Internet Protocol (TCP/IP) links, although other packet link types can be employed. Links 354 can employ packet communications for carrying iSCSI traffic or NVMe links carrying NVMe traffic. Network interfaces 334-335 can include Ethernet interfaces, IP interfaces, T1 interfaces, or other local or wide area network communication interfaces which can communicate over a communication link. Examples of communication transceivers include network interface card equipment, receivers, transmitters, modems, and other communication circuitry.

PCIe switch 332 handles back end data plane traffic for processing module 300 for storage and retrieval of data. PCIe switch 332 communicates with storage sleds through one or more I/O modules (not pictured) over PCIe links 352, and with ones of processors 311 over PCIe links 333. Each of links 352 and 333 comprises a PCIe link with eight lanes, namely a "x8" PCIe link. PCIe switch 332 comprises a PCIe cross connect switch for establishing switched connections between any PCIe interface handled by PCIe switch 332. In some examples, PCIe switch 332 comprises a PLX Technology PEX8796 24-port, 96 lane PCIe switch chip.

PCIe switches 340 handle front end data plane traffic for processing module 300 for communications between processors of different processing modules as well as with network interfaces. PCIe switches 340 communicate with other processing modules through one or more I/O modules (not pictured) over PCIe links 342, and with ones of processors 311 over PCIe links 341. Each of links 342 and 341 comprises a PCIe link with eight lanes, namely a "x8" PCIe link. PCIe switches 340 also includes external module links 343, which in this example are four x8 PCIe links. PCIe switches 340 comprise a PCIe cross connect switch for establishing switched connections between any PCIe interface handled by PCIe switches 340. In some examples, PCIe switches 340 each comprise a PLX Technology PEX8796 24-port, 96 lane PCIe switch chip.

Power control module 331 includes circuitry to selectively provide power to any of the elements of processing module 300. Power control module 331 can receive control instructions from a processor 311 over associated links 337-339 or additional communication links. Power control module 331 can receive power over power link 357 as a power source for the various elements of processing module 300. Holdup circuit 336 includes energy storage devices for storing power received over power link 357 for use during power interruption events, such as loss of source power. Holdup circuit 336 can include capacitance storage devices, such as an array of capacitors.

Figure 4:
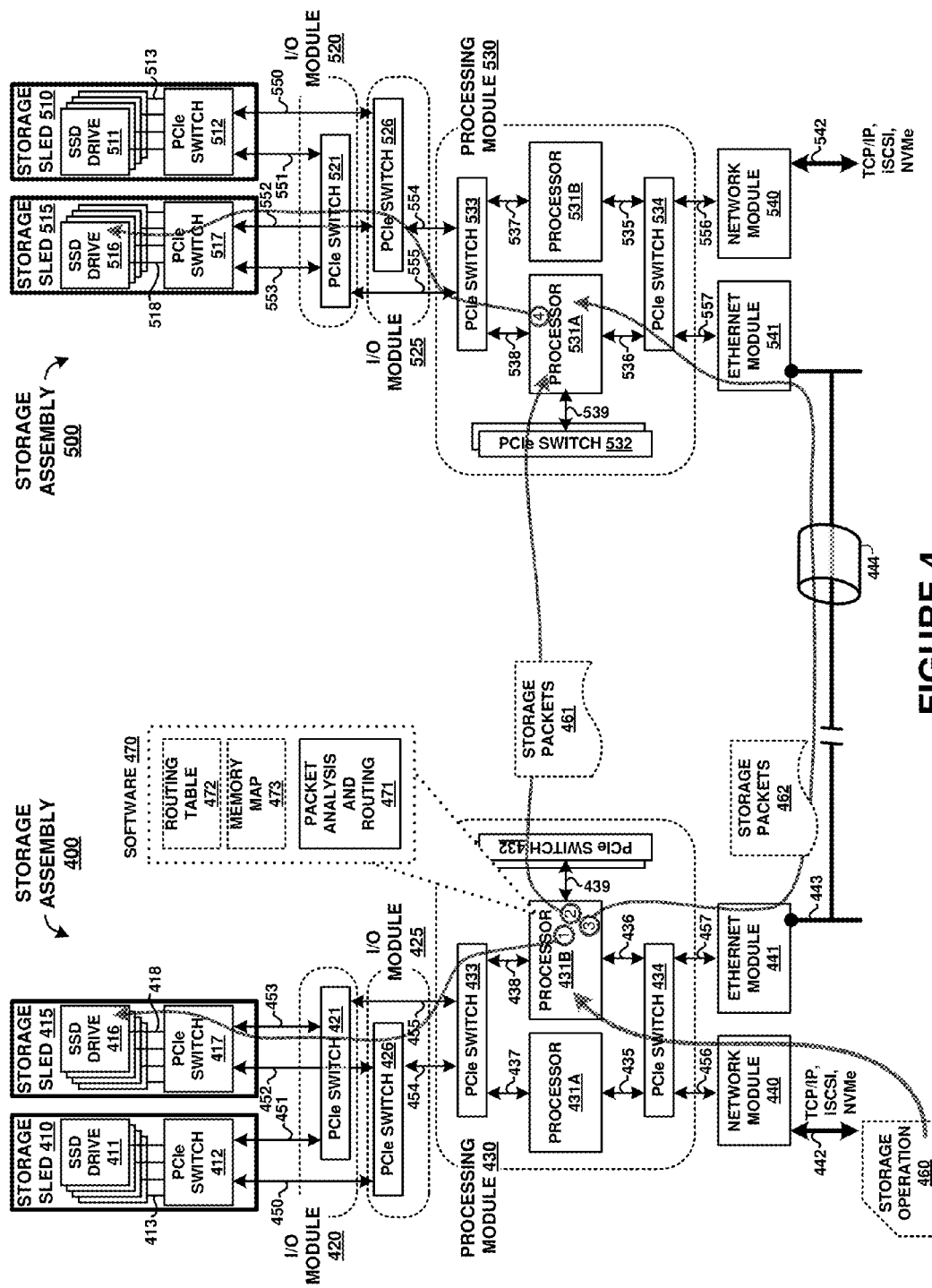
FIG. 4 is a system diagram illustrating a storage system.

FIG. 4 is a system diagram illustrating storage assembly 400 and storage assembly 500. Storage assembly 400 includes storage sleds 410 and 415, I/O modules 420 and 425, processing module 430, network module 440, and Ethernet module 441. Storage sled 410 includes SSD drives 411 and PCIe switch 412. Storage sled 415 includes SSD drives 416 and PCIe switch 417. Although two storage sleds are included in storage assembly 400, it should be understood that any number of storage sleds can be included. Also, although four SSD drives are included in each storage sled, it should be understood that any number of SSD drives can be included. I/O module 420 includes PCIe switch 421, and I/O module 425 includes PCIe switch 426. SSD drives can comprise M.2 form-factor SSD devices, 2.5" SSD devices, or other SSD devices and form factors. Although one PCIe switch is shown for each I/O module in storage assembly 400, it should be understood that any number can be included. Processing module 430 includes processors 431A and 431B and PCIe switches 433-434, and further elements can be included as discussed above.

Storage assembly 500 includes storage sleds 510 and 515, I/O modules 520 and 525, processing module 530, network module 540, and Ethernet module 541. Storage sled 510 includes SSD drives 511 and PCIe switch 512. Storage sled 515 includes SSD drives 516 and PCIe switch 517. Although two storage sleds are included in storage assembly 500, it should be understood that any number of storage sleds can be included. Also, although four SSD drives are included in each storage sled, it should be understood that any number of SSD drives can be included. I/O module 520 includes PCIe switch 521, and I/O module 525 includes PCIe switch 526. Although one PCIe switch is shown for each I/O module in storage assembly 500, it should be understood that any number can be included. Processing module 530 includes processors 531A and 531B and PCIe switches 533-534, and further elements can be included as discussed above.

Interface modules 440 and 540 each communicate over various interfaces, namely associated network interfaces 442 or 542 for TCP/IP, iSCSI, or NVMe traffic, and an associated processing module PCIe interface 456/556. Interface modules 441 and 541 each communicate over an Ethernet network 443, which can employ one or more tunneled connections, such as tunnel 444.

Processing module 430 communicates with storage sleds 410 and 415 over PCIe links 454 and 455 which are switched through associated PCIe switches on associated I/O modules. Storage sled 410 communicates with different I/O modules over respective PCIe links 450-451. Storage sled 415 communicates with different I/O modules over respective PCIe links 452-453. Processing module 530 communicates with storage sleds 510 and 515 over PCIe links 554 and 555 which are switched through associated PCIe switches on associated I/O modules. Storage sled 510 communicates with different I/O modules over respective PCIe links 550-551. Storage sled 515 communicates with different I/O modules over respective PCIe links 552-553. The elements of FIG. 4 form a storage system with multiple redundant PCIe links and Ethernet links between processing modules and storage sleds by way of I/O modules, such as those discussed herein.

In operation, a specific processor of a processing module will be configured to manage or "own" specific SSD drives on various storage sleds. For example, processor 431A can be configured to manage SSD drives 411 of storage sled 410 while processor 431B can be configured to manage SSD drives 416 of storage sled 415. Likewise, processor 531A can be configured to manage SSD drives 511 of storage sled 510 while processor 531B can be configured to manage SSD drives 516 of storage sled 515. Other combinations can be used, including a subset of SSD drives of a particular storage sled managed by a processor and the remaining SSD drives of that particular storage sled managed by another processor. Managing an SSD drive comprises a processor initializing the SSD drive and handling read, write, or other file or object transactions for the SSD drive. Each processor can reference a data structure stored on a non-transitory computer readable medium to determine which SSD drives are to be managed as well as which other processor or storage assembly manages drives that are not currently managed by a particular processor.

In some examples, a particular processor has been configured to manage a particular set of SSD drives, and that processor might experience a failure or interruption in normal operation. Responsive to the failure of a processor, such as processor 431A, another processor 431B can be configured to take over management of the SSD drives previously managed by the failed processor 431A. To take over management of the SSD drives previously managed by the failed processor 431A, processor 431B can initialize the SSD drives previously managed by the failed processor 431A and begin managing file operations, such as read and write operations, for those SSD drives. Processor 431B can include a failover table or data structure which indicates SSD drives for which processor 431B manages in the event of a failure of another processor. The failover table can also indicate a processor or processors that processor 431B monitors to determine if any failures have occurred. Similar operations can occur for processors 531A and 531B failing over to each other. In some examples, a processor in storage assembly 400 can failover to a processor in storage assembly 500.

However, during normal operations, any processor in any storage assembly in FIG. 4 might receive a storage operation for SSD drives managed by a storage system that includes both storage assembly 400 and storage assembly 500. These storage operations might be received over network module 440 or network module 540, such as iSCSI storage operations or NVMe storage operations. Load balancing between storage assemblies or processors within storage assemblies can be established to that network interfaces of a particular storage assembly can receive storage operations for SSD drives managed by that particular storage assembly or storage operations for SSD drives managed by another storage assembly. This load balancing can enhance operation over a network by allowing many different network interfaces to receive storage operations in parallel. A single logical unit can be created that spans more than one processor or storage assembly so that end user devices can exchange storage operations and associated data over any network interface presented by the storage assemblies. In one example, an iSCSI LUN is established that spans multiple storage assemblies or processors which can span SSD drives managed by elements of different storage assemblies and different network interfaces. Once a storage operation that is received by a first processor in a first storage assembly is identified as being for SSD drives managed by another processor (possibly in a second storage assembly) then that first processor can transfer the storage operation for handling by the other processor. In the specific examples herein, a PCIe interconnect can be used to transfer the storage operation, or a tunneled network connection can be employed, among other interfaces and connections.

As a specific example, storage operation 460 is received over packet link 442 by network module 440. Network module 440 receives storage operation 460 in one or more packets received over link 442, such iSCSI packets or NVMe frames, which can be transported using TCP/IP protocols. Network module 440 transfers storage operation 460 over PCIe switch 434 (and associated PCIe links 456 and 436) to processor 431B. It should be understood that processor 431A might instead receive storage operation 460.

Once storage operation 460 is received by processor 431B, packet analysis and routing process 471 is initiated in software 470. Process 471 uses routing table 472 and memory map 473 to identify a destination for storage operation 460. In a first example, processor 431B determines that it handles SSD drives associated with storage operation 460, such as SSD drives 416 which are used in a read or write operation identified by storage operation 460. In this first example, processor 431B handles a read or write operation for storage operation 460 with storage sled 415 over PCIe switch 433 and a selected one of PCIe switch 421 or 426. In a second example, processor 431B determines that another processor handles SSD drives associated with storage operation 460, such as SSD drives included in storage assembly 500. Processor 431B can then determine a pathway over which to transfer storage operation 460 to storage assembly 500. A first pathway in this second example is a PCIe fabric formed between storage assemblies using PCIe switch 432 and PCIe switch 539 and an accompanying cable and connector hardware. Storage packets 461 are transferred over this PCIe fabric to transfer storage operation 460 from processor 431B for receipt by processor 531A. A second pathway in this second example is Ethernet tunnel 444 formed between storage assemblies using Ethernet module 441, Ethernet module 541, and Ethernet link 443. Storage packets 462 are transferred over this Ethernet tunnel to transfer storage operation 460 from processor 431B for receipt by processor 531A. Communications for Ethernet tunnel 444 also are carried over PCIe switch 434 from processor 431B and PCIe switch 534 to processor 531A.

Furthermore, in addition to transferring storage operation from one processor to another processor, which may be in another storage assembly, the storage operation is transferred from a layer 2 buffer associated with the first processor (i.e. processor 431B) into a layer 2 buffer associated with the second processor (i.e. processor 531A).

Figure 5:
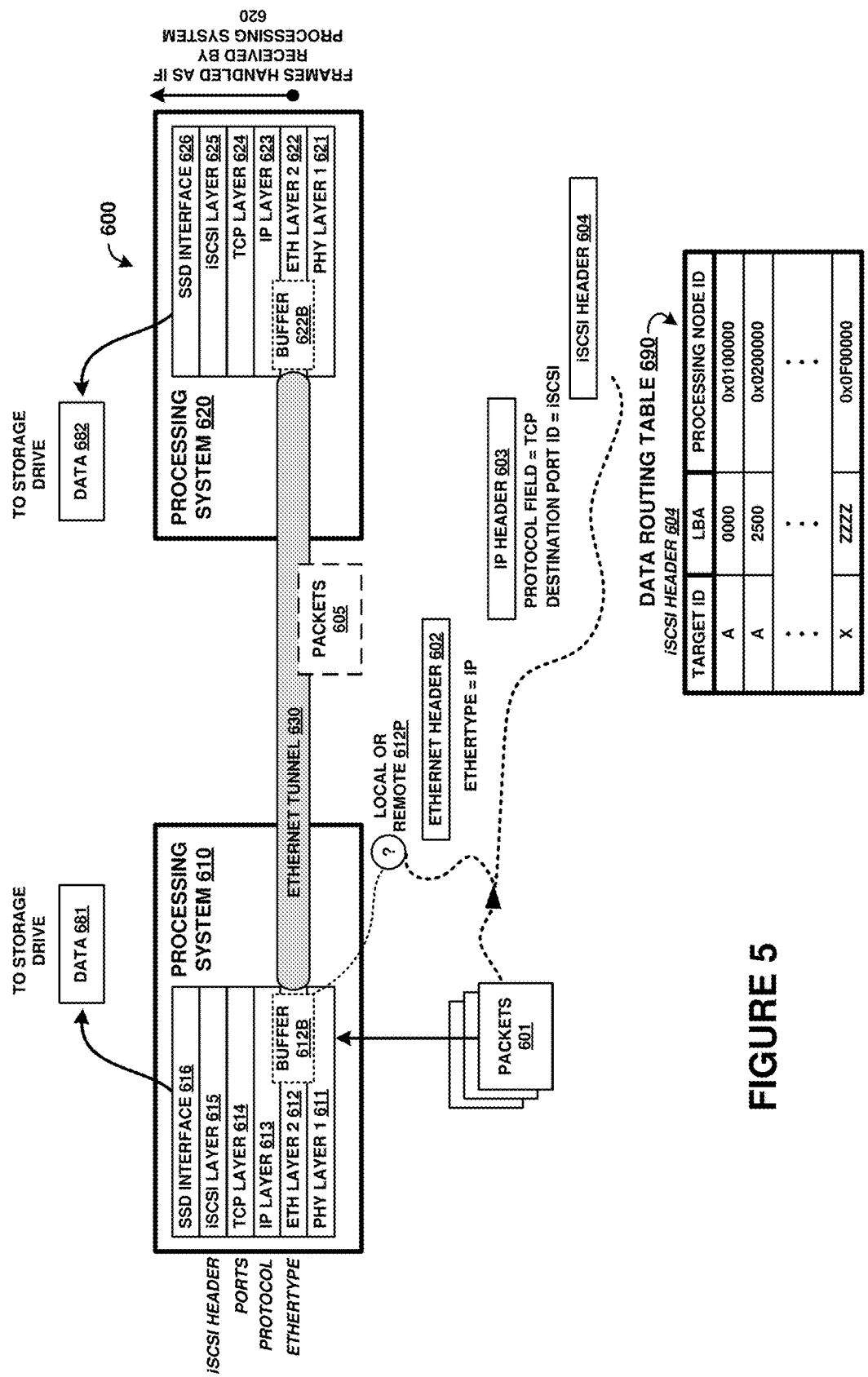
FIG. 5 is a system diagram illustrating a storage system.

To further illustrate this layer 2 buffer handling for transfer of storage operations, FIG. 5 is presented. FIG. 5 illustrates storage system 600 that receives storage operations from end user devices over an iSCSI protocol, as received in packets 601. In alternative examples, an NVMe protocol is employed instead of, or in addition to, an iSCSI protocol.

Storage system 600 includes processing system 610, processing system 620, and Ethernet tunnel 630. Further storage system elements such as found in the previous figures can be included in system 600, but are omitted for clarity in FIG. 5. Processing system 610 can be an example of processing module 430 in FIG. 4, although variations are possible. Likewise, processing system 620 can be an example of processing module 530 in FIG. 4, although variations are possible. Also, processing module 300 of FIG. 3 or processing module 230 of FIG. 2 can be employed as any of processing systems 610 and 620.

Processing system 610 and processing system 620 are communicatively coupled by at least an Ethernet network which carries Ethernet tunnel 630 over a private Ethernet connection. Ethernet tunnel 630 can be established between one or more network interfaces associated with each processing system, and can further include any number of packet networks, switches, routers, and other network elements. In some examples, Ethernet tunnel 630 is established over the same network interfaces that receive packets 601, while in other examples separate network interface elements are employed. For example, Ethernet tunnel 630 might be established over network module 440 and network module 540 of FIG. 4, or over Ethernet module 441 and Ethernet module 541 of FIG. 4. In further examples, Ethernet tunnel 630 is established over a front-end control plane such as Ethernet sideband signaling 356 in FIG. 3. Instead of Ethernet signaling or interfaces for tunnel 630, other storage-oriented interfaces might be employed such as Fiber-Channel, Infiniband, Universal Serial Bus, or other wired, optical, or wireless data interfaces.

In operation, packets 601 are received by processing system 610. These packets can be received by a network interface card associated with processing system 610, such as over an Ethernet interface of processing system 610. Packets 601 are associated with a storage operation, such as a write transaction or read transaction, for data storage on an associated storage drive, such as a storage sled or SSD as discussed herein. Each of processing systems 610 and 620 include network interfaces that can receive storage operations for each other for redundancy, load balancing, failover protection, among other features. Additionally, as discussed above, each processing system manages or owns storage drives that are particular to each processing system. Specifically, processing system 610 will manage a first set of storage drives, while processing system 620 will manage a different second set of storage drives. However, if an iSCSI storage operation for the second set of storage drives is received over a network interface associated with a processing system that manages the first set of storage drives, then the operations detailed in FIG. 5 is followed.

In FIG. 5, packets 601 are associated with a storage operation for storage drives managed by processing system 620. However, packets 601 might be received by processing system 610 which might manage a different set of storage drives not associated with packets 601. These packets will be received into the various network stack layers of a network interface of processing system 610, such as PHY layer 1 611, and ETH layer 2 612. If packets 601 were for a storage drive managed by processing system 610, then these packets can proceed further into IP layer 3 613 or further layers 614-616 for storage as data 681. However, if packets 601 were for a storage drive managed by another processing system, such as processing system 620, then the process detailed below can allow for processing system 620 to handle packets 601 for storage as data 682.

Specifically, once packets 601 are stored in buffer 612B, processing system 610 executes process 612P to determine if packets 601 are related to a storage operation for storage drives managed by processing system 610 or by another processing system. Process 612P includes checking various headers and field values of packets 601 to determine if packets 601 are associated with storage drives that processing system 610 manages or another processing system. FIG. 5 illustrates one example process 612P.

First, an Ethernet header 602 of packets 601 are examined to determine a value of the Ethertype field. If the Ethertype field indicates an IP packet, then IP header 603 is examined. If the protocol field in IP header 603 indicates TCP and the destination port identifier indicates an iSCSI port (port 3260 in some examples), then iSCSI header 604 is examined. iSCSI header 604 indicates various properties including an iSCSI target identifier and a logical block address (LBA) associated with the iSCSI target identifier. This target identifier and logical block address can be used to determine if the storage operation comprising packets 601 is for the local processor/processing system 610 or a remote processor/processing system 620, among other processors/processing systems.

As a further description, each packet (or frame) received by processing system 610 is inspected in Ethernet layer 2 (612). The iSCSI target ID and logical block address (LBA) of the request is inspected and used to reference layer 2 routing tables stored in processing system 610, such as routing table 690 in FIG. 5 or routing table 472 in FIG. 4. These routing tables indicate which processing system (or processing node) can service the incoming/inspected storage operation indicated by packets 601 (i.e. either the local processing system 610 or a remote processing system 620). When packets 601 are to be transferred to remote processing system 620, packets 601 can be encapsulated inside of another packet or packets (as indicated by packets 605), and passed over Ethernet tunnel 630. Remote processing system 620 receives packets 605 which indicate a packet type used to specify a "tunneled" storage I/O request, decodes packets 605, and then places packets 605 into buffer 622B.

It should be noted that the same memory addresses can be used in the Ethernet tunnel examples discussed herein as with PCIe fabric examples. However, instead of a PCI DMA mechanism used in the PCIe example, a local Ethernet driver places packets 605 into buffer 622B. An Ethernet driver of remote processing system 620 detects the arrival/appearance of this routed storage operation (packets 605) and processes packets 605, thus removing packets 605 from the local memory queue of the Ethernet driver and spoofing the network/IP stack just as if packets 605 had moved through the fabric after being received over an external network interface of processing system 620. Packets 605 then get processed by iSCSI 625 layer and an associated filesystem. A completion indication is generated after the associated storage operation is processed (i.e. a read or write operation). Processing system 620 passes the completion indication back to processing system 610 using one or more packets tunneled over Ethernet tunnel 630.

Table 670 indicates an example routing configuration to determine which processing system is to handle incoming iSCSI packets. It should be understood that the values indicated for table 670 are merely exemplary, and other values can be used in practice. Table 670 indicates three columns, with the first two corresponding to the target ID and the LBA found in iSCSI header 604. The third column corresponds to a processing node identifier. The processing node ID can be correlated to a PCIe address range, with each processing system or processor in a storage system that shares a PCIe address space having a corresponding address range. If the address range is for itself (local processing system 610), then processing system 610 determines that it should handle packets 601 through layers 613-616 and storage of corresponding data 681. If the address range is for a remote processing system, such as processing system 620, then processing system 610 determines that it should transfer packets 601 to the remote processing system.

If packets 601 are to be handed by another processing system, such as determined using routing table 670 discussed above, then processing system 610 transfers packets 605 from buffer 612B to the PCIe memory address location indicated by table 670 as the processing node ID over Ethernet tunnel 630. FIG. 5 shows processing system 610 transferring packets 605 over Ethernet tunnel 630 into a buffer of processing system 620, namely buffer 622B. Processing system 610 can also issue an interrupt or other signal to processing system 620 which indicates that packets 605 are waiting in buffer 622B for handling by processing system 620.

Processing system 620 checks buffer 622B responsive to an interrupt issued by processing system 610, or due to periodic polling of buffer 622B. This buffer 622B can be a buffer maintained by ETH layer 2 622 of processing system 620. ETH layer 2 622 can have more than one buffer associated therewith. A first buffer can be a circular buffer used for receiving packets over PHY layer 1 621. A second buffer can be a PCIe buffer, such as buffer 622B, that accepts packets from other processing systems over a PCIe fabric.

In this example, buffer 622B is associated with ETH layer 2 622 of a network stack of processing system 620. Processing system 620 then processes packets 605 as if processing system 620 itself had received packets 601 over its own network interface, such as by passing packets 605 to a higher layer in the network stack, including IP layer 3 623. These packets can then be handled by processing system 620 for the particular storage operation that are indicated by packets 605. For example, if packets 605 describe a write operation for SSDs managed by processing system 620, then data 682 is transferred for storage in associated storage drives by processing system 620.

Since packets 601 were originally addressed to processing system 610, portions of packets 601 can be transformed by processing system 610 to be handled by a network stack of processing system 620. The recipient peer/remote node, namely processing system 610, receives packets 601 and transforms portions of packets 601, such as TCP frames, and re-builds the Ethernet header, the IP header as packets 605 to appear as if it was sent directly to processing system 620 to prevent a network stack of processing system 620 from rejecting packets 605. This transformation can include modifying an associated MAC addresses of packets 601, Ethernet CRC value, destination IP address, and other header properties. In other examples, processing system 610 does not transform the portions of packets 601 an instead processing system 620 inhibits rejection of packets 601 due to MAC address, Ethernet CRC value, or destination IP address mismatches.

In this manner, processing system 610 can receive packets for storage operations for storage drives handled by another processing system 620. Processing system 610 inspects packets 601 and references table 670 to determine if to transfer packets 601 over Ethernet tunnel 630 to the correct processing system. Moreover, the packets are transferred into a layer 2 buffer of the correct processing system and the correct processing system handles the packets as if it had originally received the packets instead of the processing system that instead received the packets over a different network interface.

In specific examples, network driver software of a second processing system is modified to intake packets received at a first processing system as if it was received at that second processing system. Likewise, the driver software of the first processing system is also modified to transfer packets received by the first processing system for delivery into a network stack of the second processing system. The layer 2 driver software of the second processing system can receive an interrupt generated by the first processing system to indicate that new packets are waiting in an associated layer 2 buffer of the second processing system.

Figure 6:
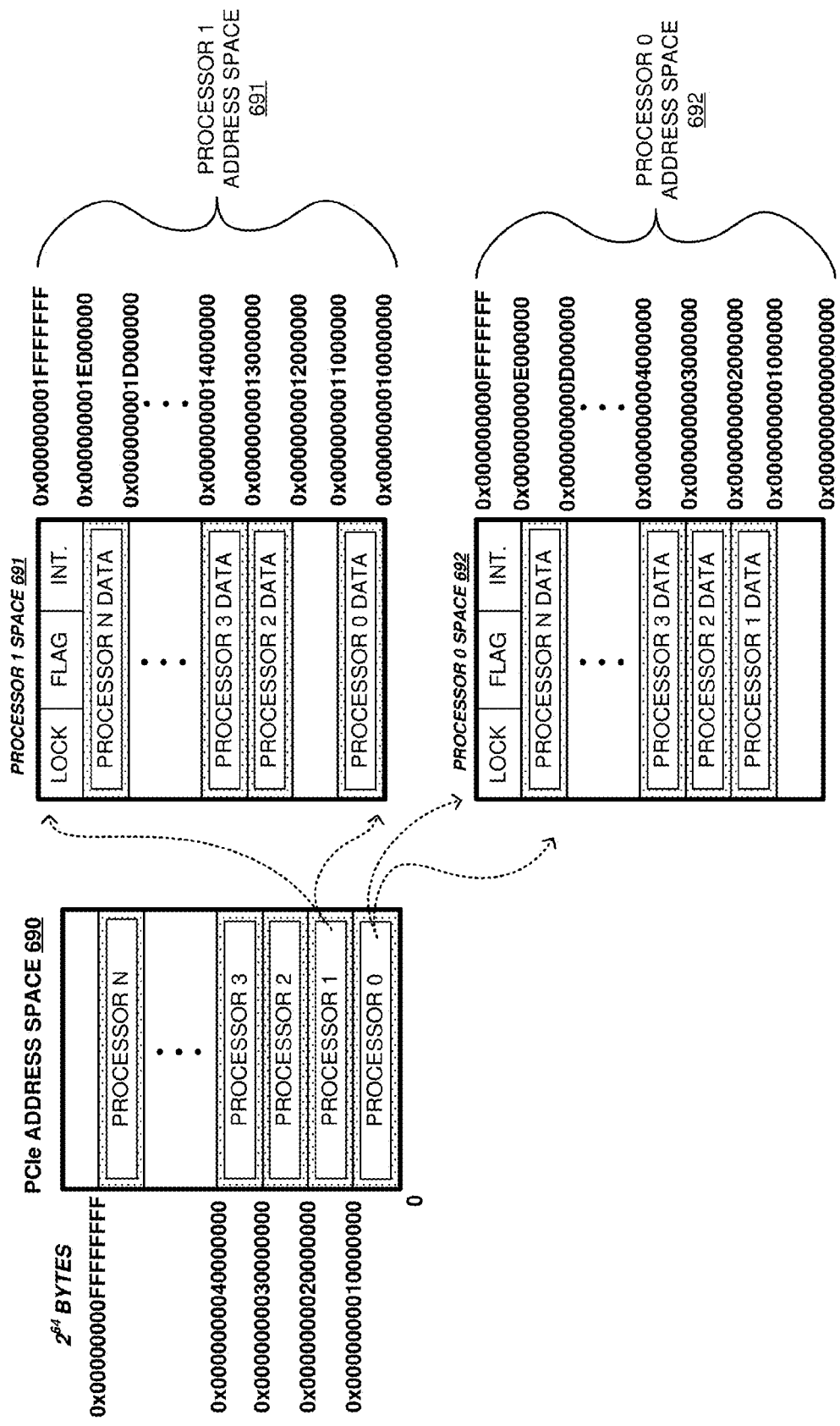
FIG. 6 is a diagram illustrating a memory allocation table.

FIG. 6 is s diagram illustrating PCIe address space 690, which can be employed for processing modules as discussed herein. PCIe address space 690 is a $2^{64}$ bit address space associated with the PCIe address space of a front end PCIe switch fabric of a storage system. PCIe address space 690 maps various ranges to buffers of particular processors or processing systems. Specifically, an address range is associated with a processing system, such as processing system 1 through N, among others. In a storage system, such that described in FIGS. 1-5, a particular processor will manage and instantiate a particular subset of the total number of storage drives, but storage operations can be received into any processor over an associated network interface. To enable load balancing and redundancy, each processor or processing system can include an associated network interface that can receive packets for storage operations, including read and write transactions. If the packets received at a first processor are for storage drives not managed by the first processor, then these packets are transferred for handling by another processor.

To facilitate the transfer of the packets and associated data from one processor to another processor, PCIe address space 690 is subdivided among the various processing systems. Each processing system in a storage system is assigned a particular quantity of storage drives, and thus is configured to intake packets and data addressed to a particular PCIe address range. A first processor transferring packets for delivery to another processor does not need to have knowledge of which exact processor is configured to handle the storage drives for the packets. Instead, the storage space of the entire storage system is divided among the various processors in the storage system, and each individual processor is configured to respond to only transactions directed to a specific address range of the PCIe address space. Thus, a storage system, such as storage system 100 in FIG. 1, can have a total storage space of $2^{64}$ bytes, or 16 exbibytes of byte-addressable memory.

When a first processor receives data packets for a storage operation, such as a read or write operation, the first processor determines if the storage address included in the data packets is for an address range managed by the first processor. If the data packets indicate a storage address managed by the first processor, then the first processor handles the storage operation, such as by transferring write data for storage in storage drives managed by the first processor or by initiating a read operation for storage drives managed by the first processor. If the data packets indicate a storage address managed by the second processor, then the first processor merely transfers the data packets to the address by the mapping to PCIe address space 690. The particular processor configured to handle storage operations for those storage addresses indicated in the data packets will be configured to receive any data transferred to the associated PCIe address range, and responsively handle the storage operation for the storage drives managed by that particular processor. The first processor does not need to know which particular processor manages particular storage drives, and instead merely transfers the data packets for a storage operation to a particular PCIe address which is automatically handled by the correct processor. From the viewpoint of the processor which receives the packets, the PCIe address space includes address ranges that it manages and address ranges it does not manage.

Moreover, each processor can have its address space sub-divided into buffer spaces for the other processors of the system. For example, processor 1 might have a first address range, but when processor 2 transfers data to processor 1, processor 2 uses its own identity as a hash into the address space of processor 1. In this manner, each processor's address space is segregated into sub-spaces that are each associated with another processor in the storage system.

As a specific example, FIG. 6 is presented. FIG. 6 includes PCIe address space 690. PCIe address space 690 is subdivided among the total number of processors in a storage system, such as in storage system 100 of FIG. 1. For example, if a storage system has 12 processors, then PCIe address space 690 can be subdivided among the 12 processors. Other configurations are possible. PCIe address space 690 can be equally subdivided, unequally subdivided, or a portion of PCIe address space 690 can be subdivided, among other configurations. The total amount of PCIe address space utilized by a storage system can correspond to the total addressable storage space provided by the collection of storage drives employed. For example, if 2 terabytes of storage space is employed, then PCIe address space 690 can have a maximum range corresponding to the 2 terabytes of storage space and each processor can have a corresponding sub-portion of that 2 terabytes of storage space allocated thereto. In yet other examples, the total amount of PCIe address space might not correspond to the total storage space of the storage system, and might be a smaller amount and used just for shuttling storage packets among the various processors for load balancing and failover fault handling. Of course, the load balancing and failover features can be employed in the example where PCIe address space 690 is correlated to the total addressable storage space of the storage system.

For each processor address space in PCIe address space 690, a further subdivision is performed. Specifically, processor 0 and processor 1 address spaces 691-692 are shown in FIG. 6. Processor 0 address space 691 includes portions assigned to each other processor in a storage system, namely processor 1-N. Additionally, processor 0 address space 691 includes a miscellaneous area that includes space for lock indicators, flags, and interrupts. These interrupts can be used to signal a receiving processor that data or packets are ready for handling. The lock and flag spaces can be used for handshaking, semaphoring, or other uses during data or packet transfer between processors.

In operation, if processor 0 desires to transfer packets to processor 1, then processor 0 will transfer the packets into the space allocated for processor 0 within address space 691 of processor 1. These packets can be transferred over an associated PCIe fabric or Ethernet tunnel as described herein. Any appropriate interrupt or flags can be set by processor 0 in the interrupt/flag/lock space of processor 1 address space 691. Processor 1 can detect that packets or other data is waiting in the address space for processor 0 and act accordingly, such as by initiating a storage operation indicated by the packets transferred by processor 0 into the address space of processor 1.

As discussed herein, each processor of a storage system is configured to have visibility to all storage drives of a particular storage system, such as by using the memory mapped address spaces in FIG. 6. However, each processor does not manage all storage drives of a particular storage system, and instead only manages a subset of the total storage drives. A PCIe fabric or Ethernet tunnel scheme is employed to exchange data and packets between processors and maintain visibility for each processor to each storage drive. A PCIe back end data plane is employed to transfer data to and from actual storage drives and the various managing processors. One or more PCIe switches form the PCIe back end data plane. An initialization process is performed for each processor of a storage system to allow each processor to manage the particular subset of the storage drives. Typically for a processor that manages storage drives, the processor performs a PCIe discovery process to find the storage drives connected via PCIe interfaces to the processor to initialize or enumerate those storage drives. In some examples, for storage drives not managed by a processor, initialization software spoofs the enumeration process for that processor so that processor thinks that the PCIe discovery process has found all storage drives in the storage system.

For example, a first processor, upon boot up or responsive to a reconfiguration process, performs a scan of any associated PCIe interfaces for devices that the first processor is to manage and enumerate. However, in a storage system such as that included in FIG. 1, many storage drives are included, and only a particular processor manages a subset of the total storage drives. The first processor is allowed to enumerate and initialize a subset of the storage drives that it is to manage. Similarly, other processors will enumerate and initialize different subsets of the storage drives. In this manner, each processor can have access to all storage drives via a PCIe fabric or Ethernet tunnel, but only physically manage a subset of the storage drives on a PCIe back end data plane. Thus, a large shared storage space can be provided using many different processors, with each processor only managing a small associated portion of the total storage space.

Normally, each processor will want to enumerate and initialize all the storage drives that each processor "sees" over the PCIe bus, which would include all the storage drives of a storage system since all storage drives are connected to all processors via a shared back end PCIe switch fabric, such as found in FIG. 2. By segregating a back end data plane initialization process for each processor, the storage drives can be allocated among the various processors even though a shared front end data plane PCIe address space is employed across all processors.

When a particular processor fails, then the storage drives managed by that particular processor can be re-assigned to another processor for managing storage operations. An initialization process can be performed between the storage drives associated with the failed processor and the replacement processor to enumerate those storage drives with the replacement processor. The replacement processor is configured to handle transactions addressed to the failed processor's address space, in addition to any address spaces the replacement processor might have previously managed.

Figure 7:
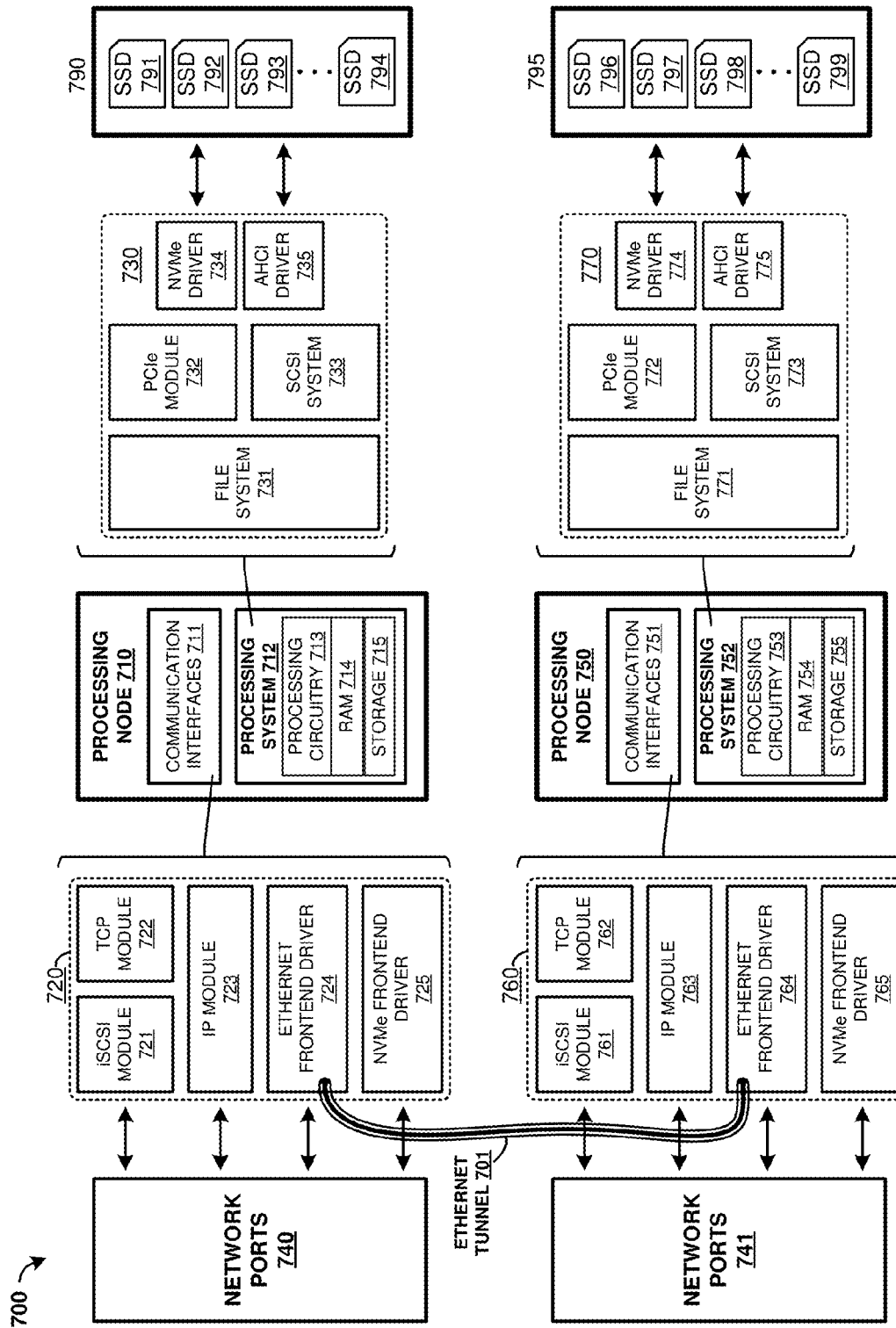
FIG. 7 is a system diagram illustrating a storage platform.

Further examples and embodiments are included in FIG. 7. FIG. 7 includes storage platform 700. In the context of FIG. 7, "tunneling" means transferring storage operations between processing nodes through a tunneled Ethernet network instead of transferring the storage operations between processing nodes over a PCIe data plane. Examples of a PCIe data plane are discussed above in FIGS. 1-4.

FIG. 7 shows storage modules 790 and 795 each including one or more storage drives 791-794 and 796-799. These storage drives can include PCIe-based SSD devices as discussed herein. The storage modules are managed by any of the processing nodes, namely 710 and 750. In this example, processing node 710 manages storage module 790 and processing node 750 manages storage module 795, although other configurations are possible, including combinations of management among processing nodes.

Processing nodes are connected via a dedicated Ethernet link that can serve as a control plane for exchanging operational and administrative protocol packets that implement cluster, node, and/or device event propagation between peer nodes in the cluster of storage nodes. In FIG. 7, Ethernet tunnel 701 is established between processing node 710 and processing node 750 through Ethernet front end driver 724 and Ethernet front end driver 764.

A specific protocol packet type can be defined to identify the packets used for storage operations as being distinct from operational and administrative packets transferred over Ethernet or tunnel 701. This packet type encapsulates PCIe data storage operations for transfer over an Ethernet tunnel instead of passing it over a PCIe fabric. Encapsulation and decapsulation can be done by two modules mentioned in FIG. 7. Specifically, processing module 710 includes TCP/IP stack 720 and processing module 750 includes TCP/IP stack 760, and each TCP/IP stack sends/receives the tunneled packets. The associated processing module decodes the tunneled packets into PCIe data storage operations and places the PCIe data storage operations into RAM 714 similarly to how a PCIe fabric DMA transfer of PCIe data storage operations would move the PCIe data storage operations to a specific RAM location. Thus, instead of a PCIe fabric transfer, PCIe data storage operations can be transferred over a tunneled Ethernet connection between two processing nodes. This can be advantageous when processing modules are distant and might not have PCIe fabric links available to link the processing modules, or to transfer low-priority storage operations while reserving a PCIe fabric for high-priority storage operations.

In some example operations, storage packets might be received by network ports 740 which are associated with processing node 710. In other example operations, storage packets might be received by network ports 741 which are associated with processing node 750. These storage packets might comprise iSCSI storage operations, NVMe storage operations, or other types of storage operations directed to any of the storage drives in FIG. 7.

In a first example, processing node 710 can receive these storage operations into RAM 714 and determine if processing node 710 handles the storage modules associated with the storage operations. If the storage operations are for handling by processing node 710, then the storage operations can be processed and any associated read or write operation handled with respect to storage drives 791-794 in storage module 790, which can include handling over a PCIe interface or PCIe fabric. File system 731 and associated storage interfaces/drivers 732-735 are shown in module 730 and can handle management and interfacing with storage module 790. If the storage operations are for handling by processing node 750 instead of processing node 750, then processing node 710 can transfer the storage operations over tunnel 701 for delivery to processing node 750. Processing node 750 then processes the storage operations and associated read or write operation are handled with respect to storage drives 796-799 in storage module 795, which can include handling over a PCIe interface or PCIe fabric. File system 771 and associated storage interfaces/drivers 772-775 are shown in module 770 and can handle management and interfacing with storage module 795.

Turning to the elements of FIG. 7, network ports 740-741 comprise one or more networking ports, such as Ethernet ports which can receive Ethernet traffic, IP traffic, iSCSI traffic, NVMe traffic, or other traffic, including combinations thereof. TCP/IP stacks 720 and 760 comprise software drivers and modules which handle network stack processing and packet handling operations. TCP/IP stacks 720 and 760 comprise similar elements as seen in the network stacks of FIG. 5. TCP/IP stack 720 includes NVMe frontend driver 725, Ethernet frontend driver 724, IP module 723, iSCSI module 721, and TCP module 722. TCP/IP stack 760 includes NVMe frontend driver 765, Ethernet frontend driver 764, IP module 763, iSCSI module 761, and TCP module 762. Other modules and drivers can be included.

Processing nodes 710 can comprise one or more microprocessors and other processing circuitry that retrieves and executes associated software 720 and 730 from RAM 714 and storage 715. Processing nodes 750 can comprise one or more microprocessors and other processing circuitry that retrieves and executes associated software 760 and 770 from RAM 754 and storage 755. Processing nodes can be implemented within a single processing device but can also be distributed across multiple processing devices or sub-systems that cooperate in executing program instructions. Examples of processing nodes include general purpose central processing units, application specific processors, and logic devices, as well as any other type of processing device, combinations, or variations thereof. In some examples, processing nodes comprise an Intel or AMD microprocessor, ARM microprocessor, FPGA, ASIC, application specific processor, or other microprocessor or processing elements.

Each of the processing nodes includes a storage system comprising RAM and nonvolatile storage. For example, processing node 710 includes RAM 714 and storage 715, processing node 750 includes RAM 754 and storage 755. The storage systems can comprise any non-transitory computer readable storage media capable of storing software that is executable by processor nodes. The storage systems can include volatile and nonvolatile, removable and non-removable media implemented in any method or technology for storage of information, such as computer readable instructions, data structures, program modules, or other data. The storage systems can be implemented as a single storage device but can also be implemented across multiple storage devices or sub-systems co-located or distributed relative to each other. The storage systems can comprise additional elements, such as a controller, capable of communicating with associated processing nodes. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 720, 730, 760, and 770 can each be implemented in program instructions and among other functions can, when executed by associated processing nodes 710 and 750 in general or processing systems 712 and 752 in particular, direct the associated processors to operate as commanded by the software. Software can include processes, programs, or components, such as operating system software, drivers, network stacks, communication modules, communication interfaces, file systems, database software, or application software. Software can also comprise firmware or some other form of machine-readable processing instructions executable by elements of a processing system. Encoding software on a storage system can transform the physical structure of the associated storage system. The specific transformation of the physical structure can depend on various factors in different implementations of this description. Examples of such factors can include, but are not limited to the technology used to implement the storage media of the storage system and whether the computer-storage media are characterized as primary or secondary storage. For example, if the computer-storage media are implemented as semiconductor-based memory, the software can transform the physical state of the semiconductor memory when the program is encoded therein. For example, the software can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Each of the processing nodes also interface with one or more communication interfaces and associated target ports. Processing node 710 includes communication interface 711 which can interface over at least network ports 740. Processing node 750 includes communication interface 751 which can interface over at least network ports 741. These communication interfaces can communicate over one or more packet network links comprising the network ports to communicate over one or more packet network links. Network ports can be communicatively coupled to an associated processing node via PCIe links, such as those seen in FIG. 3. External access by end users or end user devices to processing nodes, and the storage modules managed thereby, can be provided over ones of the packet network links. Inter-module communications between processing nodes and other processing nodes of a storage assembly or in other storage assemblies can be provided over ones of network ports 740-741, which can comprise Ethernet links or Transmission Control Protocol/Internet Protocol (TCP/IP) links, although other packet link types can be employed. The links can employ communications for carrying iSCSI traffic or NVMe traffic. The communication interfaces can further include communication transceivers such as network interface card equipment, receivers, transmitters, modems, and other communication circuitry.

Each storage drive 791-794 and 796-799 comprises a solid state drive (SSD) in this example, and communicates over an associated PCIe interface included in each storage drive. Each storage drive can comprise an individual M.2 SSD card, which communicates over an associated PCIe interface, which can comprise PCIe interfaces such as described for PCIe interface 240 in FIG. 2, although variations are possible in interfacing, storage media, and form factor. The solid state storage media of the storage drives can comprise flash memory, static RAM, NAND flash memory, NOR flash memory, memristors, or other solid state media. Instead of or in addition to solid state media, each storage drive can comprise magnetic storage, such as hard disk drives, tape drives, magnetoresistive memory devices, and the like, or can comprise optical storage, such as phase change memory.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A data storage system, comprising:
a first processing module configured to receive over a first network interface one or more packets indicating the first network interface as a network destination and comprising a storage operation, inspect at an Ethernet network layer of the first network interface at least a storage address included in a header of the one or more packets to determine that the storage operation indicates a storage drive managed by a second processing module, and establish one or more further packets comprising the storage operation and having an Ethernet header modified from the one or more packets to indicate a layer-2 network address of a network interface associated with the second processing module, and transfer the one or more further packets for delivery to the network interface associated with the second processing module over a tunneled network connection; and the second processing module configured to detect the one or more further packets comprising the storage operation received over the tunneled network connection, inspect at least the storage address included in a header of the one or more further packets to determine that the storage operation indicates the storage drive managed by the second processing module, and handle the storage operation with the storage drive.

2. The data storage system of claim 1, comprising:
the first processing module configured to identify the storage operation as being associated with the storage drive managed by the second processing module by at least comparing the storage address included in the header of the one or more packets against a storage allocation table corresponding to a shared address space of a communication fabric that is shared by at least the storage drive, the first processing module, and the second processing module, wherein the storage allocation table indicates allocations of storage addresses among processing modules using the shared address space of the communication fabric.

3. The data storage system of claim 1, comprising:
the first processing module configured to establish the tunneled network connection over an Ethernet link of a second network interface of the first processing module to communicatively couple the first processing module and the second processing module.

4. The data storage system of claim 3, wherein the first processing module and the second processing module are located in separate racks of a data center.

5. The data storage system of claim 3, wherein the first processing module is located at a first site and the second processing module is located at a second site remote from the first site.

6. The data storage system of claim 1, further comprising:
a third processing module configured to manage a further storage drive;
the first processing module configured to receive a second storage operation, identify the third processing module as managing the further storage drive associated with the second storage operation, and responsively transfer the second storage operation over a communication fabric shared by at least the first processing module and the third processing module;
the third processing module configured to receive the further storage operation over the communication fabric and handle the second storage operation with the further storage drive.

7. The data storage system of claim 1, comprising:
the first processing module configured to alter at least the Ethernet header of the one or more packets to form one or more further packets which, when altered, indicate a media access control (MAC) address of the network interface associated with the second processing module as a network destination of the one or more further packets instead of the first network interface, and transfer the one or more further packets comprising the storage operation over the tunneled network connection into a layer-2 network buffer associated with the network interface associated with the second processing module.

8. The data storage system of claim 7, comprising:
the second processing module configured to detect the one or more further packets comprising the storage operation in the layer-2 network buffer, and process at least one packet corresponding to the storage operation further up a network stack to handle the storage operation with the storage drive.

9. The data storage system of claim 1, comprising:
the first processing module configured to process the one or more packets comprising the storage operation to determine that the storage operation indicates the storage drive managed by the second processing module by at least inspecting one or more headers of the one or more packets to determine at least a logical block address and Internet Small Computer System Interface (iSCSI) target associated with the storage operation.

10. A method of operating a data storage system, the method comprising:
in a first processing module, receiving over a first network interface one or more packets indicating the first network interface as a network destination and comprising a storage operation, inspecting at an Ethernet network layer of the first network interface at least a storage address included in a header of the one or more packets to determine that the storage operation indicates a storage drive managed by a second processing module, and establishing one or more further packets comprising the storage operation and having an Ethernet header modified from the one or more packets to indicate a layer-2 network address of a network interface associated with the second processing module, and transfer the one or more further packets for delivery to the network interface associated with the second processing module over a tunneled network connection; and
in the second processing module, detecting the one or more further packets comprising the storage operation received over the tunneled network connection, inspecting at least the storage address included in a header of the one or more further packets to determine that the storage operation indicates the storage drive managed by the second processing module, and handling the storage operation with the storage drive.

11. The method of claim 10, further comprising:
in the first processing module, identifying the storage operation as being associated with the storage drive managed by the second processing module by at least comparing the storage address included in the header of the one or more packets against a storage allocation table corresponding to a shared address space of a communication fabric that is shared by at least the storage drive, the first processing module, and the second processing module, wherein the storage allocation table indicates allocations of storage addresses among processing modules using the shared address space of the communication fabric.

12. The method of claim 10, further comprising:
in the first processing module, establishing the tunneled network connection over an Ethernet link of a second network interface of the first processing module to communicatively couple the first processing module and the second processing module.

13. The method of claim 12, wherein the first processing module and the second processing module are located in separate racks of a data center.

14. The method of claim 12, wherein the first processing module is located at a first site and the second processing module is located at a second site remote from the first site.

15. The method of claim 10, further comprising:
in a third processing module, managing a further storage drive;
in the first processing module, receiving a second storage operation, identifying the third processing module as managing the further storage drive associated with the second storage operation, and responsively transferring the second storage operation over a communication fabric shared by at least the first processing module and the third processing module;
in the third processing module, receiving the further storage operation over the communication fabric, and handling the second storage operation with the further storage drive.

16. The method of claim 10, further comprising:
in the first processing module, altering at least the Ethernet header of the one or more packets to form the one or more further packets which, when altered, indicate a media access control (MAC) address of the network interface associated with the second processing module as a network destination of the one or more further packets instead of the first network interface, and transferring the one or more further packets comprising the storage operation over the tunneled network connection into a layer-2 network buffer associated with the network interface associated with the second processing module.

17. The method of claim 16, further comprising:
in the second processing module, detecting the one or more further packets comprising the storage operation in the layer-2 network buffer, and processing at least one packet corresponding to the storage operation further up a network stack to handle the storage operation with the storage drive.

18. The method of claim 10, further comprising:
in the first processing module, processing the one or more packets comprising the storage operation to determine that the storage operation indicates the storage drive managed by the second processing module by at least inspecting one or more headers of the one or more packets to determine at least a logical block address and Internet Small Computer System Interface (iSCSI) target associated with the storage operation.

19. A data storage platform, comprising:
a plurality of storage systems each comprising storage drives and processing modules coupled over a communication fabric having an address space shared among the plurality of storage systems and processing modules;
a first processing module of a first storage system configured to receive one or more packets comprising a storage operation, the storage operation indicating a storage location;
the first processing module configured to inspect at an Ethernet network layer of a network interface associated with the first processing module at least a header of the one or more packets to determine the storage location;
the first processing module configured to determine the storage location as corresponding to at least one of the storage drives managed by a second processing module by at least processing the storage location against a storage allocation table for the address space;
the first processing module configured to transfer at least one further packet comprising the storage operation from a layer-2 network buffer associated with the network interface associated with the first processing module over a tunneled network connection for delivery of the at least one further packet into a layer-2 network buffer associated with a network interface associated with the second processing module, wherein the at least one further packet includes a Ethernet header indicating a modified layer-2 network address of a network interface associated with the second processing module; and
the second processing module configured to detect the at least one further packet in the layer-2 network buffer associated with the network interface associated with the second processing module, inspect at least the storage location included in a header of the at least one further packet to determine that the storage operation indicates the at least one of the storage drives managed by the second processing module, and process the storage operation through a network stack to handle the storage operation with at least the one of the storage drives that corresponds to the storage location.

20. The data storage platform of claim 19, comprising:
the first processing module configured to identify the second processing module as managing the storage location instead of the first processing module by at least comparing the storage location included in the header of the one or more packets against the storage allocation table, wherein the storage allocation table indicates allocations of storage locations among the processing modules using the shared address space of the communication fabric.

* * * * *